United States Patent [19]
Sarbacher et al.

[11] 3,889,170
[45] June 10, 1975

[54] BATTERY CHARGE RATE CONTROL

[75] Inventors: Robert I. Sarbacher; Robert E. Mauch, both of Santa Monica, Calif.

[73] Assignee: John C. Bogue, Santa Monica, Calif.

[22] Filed: Aug. 1, 1973

[21] Appl. No.: 384,418

Related U.S. Application Data

[63] Continuation of Ser. No. 289,534, Sept. 15, 1972, abandoned.

[52] U.S. Cl. .................. 320/14; 320/23; 320/43; 320/45
[51] Int. Cl. ............................................. H02j 7/04
[58] Field of Search ............ 320/23, 24, 43, 44, 45, 320/9, 19, 14; 324/94

[56] References Cited
UNITED STATES PATENTS
3,652,917   3/1972   Biggs..................................... 320/45
3,710,225   1/1973   Herzig............................... 320/45 X

*Primary Examiner*—J. D. Miller
*Assistant Examiner*—Robert J. Hickey
*Attorney, Agent, or Firm*—Witherspoon and Lane

[57] ABSTRACT

Battery charging control circuitry suitable for use with any secondary battery is disclosed. The amount of charge to a battery is measured by a coulometer or coulometers and the charge is reduced to zero or to a trickle charge when a given amount of charge has been applied to the battery from a charger. In a first embodiment the battery is then switched to a load by sensing circuitry and discharged. The discharge is also measured by the coulometer or coulometers and the battery is removed from the load and placed back on charge after it has supplied a charge to the load that is equal to the charge applied to the battery from the charger. In this first embodiment, a plurality of sequential charge rates can be provided to the battery by means of a plurality of parallel connected coulometers. In a second embodiment, the battery remains connected on a load at all times and a plurality of charge rates is provided by means of a plurality of series connected coulometers and a constant voltage charger. With the circuitry of this invention, excessive charge and discharge of the battery is prevented.

12 Claims, 5 Drawing Figures

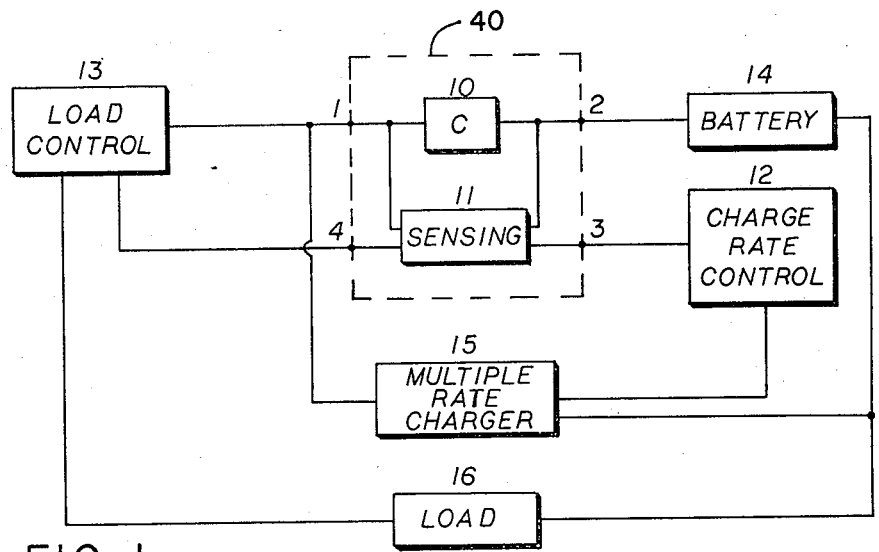
FIG. 1
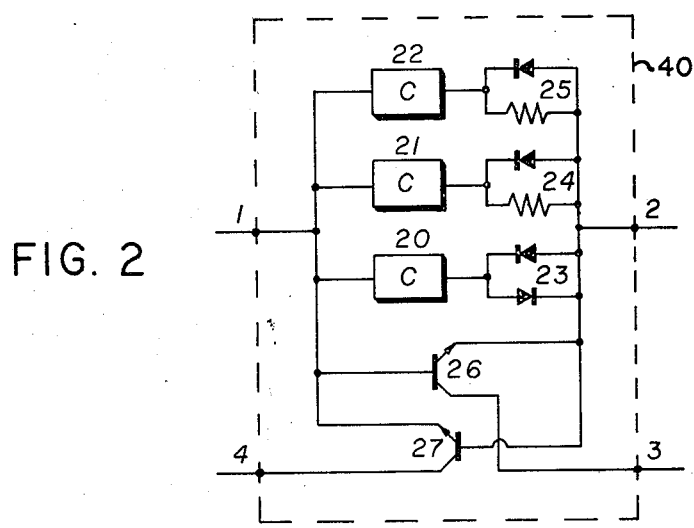
FIG. 2
FIG. 3

BATTERY CHARGE RATE CONTROL

This is a continuation, of application Ser. No. 289,534 filed Sept. 15, 1972, now abandoned.

BACKGROUND OF THE INVENTION

This invention relates to battery charging circuitry; and more particularly to battery charge rate control circuitry for use with batteries which are continuously maintained in a charged state. It provides high charge rates without excessive overcharging and also prevents excessive deep discharge of the battery.

The cycle life of secondary batteries may be seriously impaired by excessive overcharge. Such overcharge conditions may easily occur when batteries are charged at a high rate. Similarly, the cycle life of certain types of secondary batteries may be impaired by excessively deep discharge. For example, with nickel-cadmium batteries, a deep discharge may completely destroy the usefulness of the battery.

Many different types of battery chargers are known in the art. Some chargers provide a high rate of charge, others a low rate and still others provide multiple charge rates. The high rate chargers are intended to charge the battery rapidly and are, therefore, normally connected across the battery for a relatively short period of time. On the other hand the slower rate chargers are connected to the battery for a longer period of time. However, in both cases overcharge can occur, particularly with the high rate chargers, if the battery is on charge for too long a period of time.

The prior art multiple rate chargers generally charge at a high rate for a first given period of time, then at a lower rate for a second period of time, and then at a still lower rate. The lower charge rate is so low that overcharge should not occur. However, even with these multiple rate chargers, overcharging can occur. The most severe damage caused by overcharging secondary batteries occurs when the batteries are being charged at a high rate. Therefore, overcharging at a high rate must be absolutely prevented.

In order to prevent overcharging, several different methods have been employed with the prior art chargers. With some of the prior art chargers timing means that automatically cut off the charger after a given period of time are employed. When time is the sole parameter, overcharge or undercharge can take place depending upon the condition of the battery when first placed on charge. Another prior art method widely used is the sensing of the battery voltage to control the charger. In such systems the battery is taken off charge when the battery terminal voltage reaches a set value or is placed on trickle charge in some multiple rate systems when this voltage is reached.

Some of the prior art systems discussed above are automatic systems in that the battery is automatically placed on charge when the battery voltage falls below a certain value, or after the battery has been on load for a certain period of time. Similarly, the battery is removed from the charger in these automatic systems after the voltage increase to a certain value or after the battery has been on charge for a given period of time. These systems do give a measure of protection against excessive overcharge and excessive discharge. However, even with these systems such overcharge and discharge can occur. The circuitry of this invention provides a high rate of charge with protection against excessive overcharge and also provides protection against excessive discharge.

SUMMARY OF THE INVENTION

The charging circuitry of this invention measures the amount of current that flows into a battery from a charger and also measures the amount of current the battery supplies to a load. The function of this circuit is to allow only that amount of recharging current to flow into the battery as was removed from the battery by the load.

The amount of charging current and the amount of load current supplied by the battery are measured by a coulometer. After a given amount of current passes through the coulometer, the coulometer provides a signal which indicates the state of the battery. This signal is utilized to control the charger and in one embodiment to connect or disconnect the load from the battery.

In one embodiment of the invention, multiple rate charging is provided by means of a multiple rate charger controlled by a plurality of coulometers. In a second embodiment, multiple rate charging is provided by means of a constant voltage charger in combination with a plurality of serially connected coulometers, each shunted by individual diode resistance circuits.

The coulometers are preset for a given battery system so that excessive overcharge and excessive deep discharge are prevented. The coulometers provide a true measure of the state of the battery and provide control signals to control the battery charger. By use of the coulometers, the amount of charging current is directly proportional to the state of discharge of the battery. Thus, the battery cannot be excessively overcharged or discharged.

BRIEF DESCRIPTION OF THE DRAWING

A complete understanding of the invention can be obtained from the following detailed description when read in conjunction with the annexed drawing in which:

FIG. 1 is a block diagram showing a first embodiment of the invention;

FIG. 2 is a block and schematic diagram showing in detail a portion of the circuitry of FIG. 1;

FIG. 3 is a block and partial schematic diagram showing a second embodiment of the invention;

DETAILED DESCRIPTION OF THE INVENTION

Figure 4:
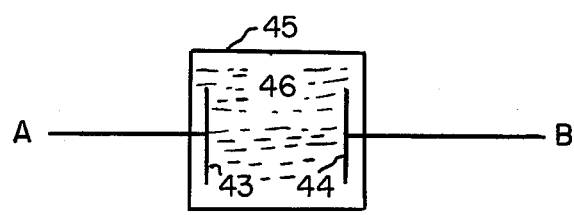
FIG. 4 shows a coulometer of the type used in the circuitry of this invention.

As shown in FIG. 1, the circuitry comprises a battery 14, a load 16 connected between battery 14 and a load control circuit 13. A coulometer 10 and a sensing circuit 11 connected across coulometer 10 are shown within the dash line block 40. One side of the coulometer 10 is connected to the terminal 1 and the other side is connected to the terminal 2. Similarly, one side of sensing circuit 11 is connected to the terminal 3 and the other side is connected to the terminal 4. A charge rate control circuit is connected between terminal 3 and a multiple rate charger 15. Multiple rate charger 15 is connected directly to one side of battery 14 and to the other side of battery 14 through terminal 1 and coulometer 10. In addition to being connected to load 16, load control circuit 13 has separate connections to terminals 1 and 4.

FIG. 2 is an expanded view of the circuitry inside box 40. As shown in FIG. 2, coulometer 10 of FIG. 1 actually comprises the three coulometers 20, 21 and 22. As will be apparent later, a plurality of coulometers is used to provide different charge rates. The number of coulometers used is equal to the number of charge rates desired, or may be one less than the number of charge rates desired if one of the charge rates is a trickle charge.

The coulometers 20, 21 and 22 of FIG. 2 are bidirectional devices for measuring electrical charges. Since an electrical charge is defined as the product of current and time, coulometers 20, 21 and 22 will measure the amount of current flowing through the circuit in which they are connected in any given period of time.

In order to provide a clear and complete description of how the coulometers 20, 21 and 22 operate in the circuitry of FIGS. 1 and 2, the operation of a typical coulometer that can be utilized will be discussed with reference to FIGS. 4 and 5 before proceeding with a further discussion of FIGS. 1 and 2. FIG. 4 shows a conventional coulometer having the terminals A and B, electrodes 43 and 44, and an electrolyte 46. Current may be passed in either direction through coulometer 45 (i.e., from terminal A to B or from terminal B to A).

Figure 5:
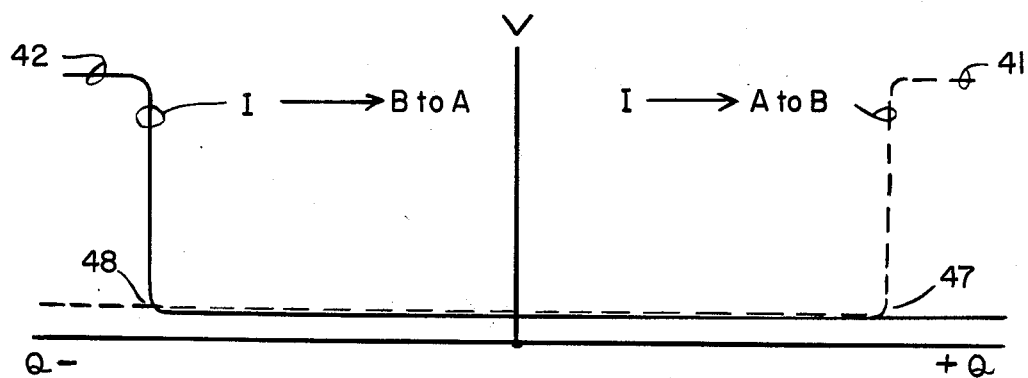
FIG. 5 is a graph of the terminal characteristics of the coulometer of FIG. 4.

FIG. 5 is a graph showing the terminal characteristics of coulometer 45 when a charge is passed through the coulometer in either direction. In FIG. 5, the dotted line 41 represents the voltage vs. charge characteristic of coulometer 45 when charge is flowing from terminal A to terminal B, and the solid line 42 represents the voltage vs. charge characteristic when charge is flowing from terminal B to terminal A.

As electricity is passed through coulometer 45 in either direction, the voltage across terminals A and B remains very low until the points 47 and 48 are reached. At these points the voltage rises as indicated in FIG. 5. A point at which the voltage rises is referred to as an end point of the coulometer. Thus, in FIG. 5, points 47 and 48 are end points. Any point lying between these points is an intermediate point and the coulometer is in its low voltage state at any and all intermediate points. For all practical purposes, this voltage is a constant low voltage.

Assume that a charge has been flowing through coulometer 45 in the direction of terminal A to terminal B, then after a given period of time, determined by design characteristics, the end point 47 will be reached and coulometer 45 will exhibit an abrupt voltage rise across terminals A and B. If at this time the direction of the flow of the charge is reversed so that the direction of flow is now from terminal B to terminal A, the voltage across terminals A and B will be reduced to its normal low value exhibited along the intermediate points between end points 47 and 48. This low voltage will continue until a given period of time has lapsed; at the end of this time period, coulometer 45 will reach end point 48 and again exhibit an abrupt voltage rise across its terminals A and B. If the direction of flow of charge is again reversed, the same process is repeated with the coulometer again exhibiting a voltage rise when end point 47 is reached.

If a fixed value of current flows through coulometer 45 in the direction of terminal B to terminal A when coulometer 45 is at end point 47, then it is obvious that a fixed amount of time will be required before coulometer 45 reaches end point 48. If when end point 48 is reached, this same fixed value of current is applied in the direction of terminal A to terminal B, then the same fixed amount of time that was required for coulometer 45 to go from end point 47 to 48 will be required for the coulometer to go from end point 48 back to end point 47. If the current varies, the time required for coulometer 45 to go from end point 47 to 48 or 48 to 47 will vary accordingly (i.e., the time decreases if the current increases and vice-versa). Thus, it is quite apparent that coulometer 45 measures charge (current X time) and that the amount of charge required for coulometer 45 to go from end point 47 to end point 48 is equal to the amount of charge required for the coulometer to go from end point 48 back to end point 47. In other words, a given fixed amount of charge is required to go from one end point, in either direction, to the other end point. This amount of charge, which is called the capacity of the coulometer, is a preset amount for which a particular coulometer is designed and constructed. Coulometers having different capacities are available on the market.

A diode-resistor network 25 is connected between one side of coulometer 22 and terminal 2. Similarly, a diode-resistor network 24 is connected between coulometer 21 and terminal 2 and a network 23 comprising a pair of oppositely poled parallel connected diodes is connected between coulometer 20 and terminal 2.

The sensing circuitry 11 of FIG. 1 is shown in FIG. 2 as comprising a pair of transistors 26 and 27. The emitter of transistor 26 is connected to the networks 23, 24 and 25; the collector of this transistor is connected to terminal 3 and thus charge rate control circuit 12; and the base of this transistor is connected to coulometers 20, 21 and 22. Transistor 27 has its base connected to networks 23, 24 and 25; its emitter connected to coulometers 20, 21 and 22 and its collector connected to terminal 4 and thus, to load control circuit 13.

When battery 14 is fully charged and on load, all of the coulometers 20, 21 and 22 are in a high voltage state that is at an end point. As current is supplied to the load from battery 14, coulometers 20, 21 and 22 start toward the other end point and, therefore, exhibit their low voltage states until this other end point is reached. During this time, the same amount of current flows through all three coulometers and, therefore, all three coulometers will have recorded an equal amount of current flow out of battery 14 at any given time. When coulometers 20, 21 and 22 reach their other end point, the voltage across their terminals abruptly rises. In the circuit of FIG. 1, this voltage rise during the discharge period is interpreted as being the point at which load 16 must be disconnected from battery 14 to prevent excessive discharge and the point at which battery 14 is to be charged. If, of course, no charging were provided, the voltage rise would merely be interpreted as being the point at which the load must be disconnected to prevent excessive discharge of battery 14.

In FIGS. 1 and 2, transistor 27 provides a signal in response to the voltage rise across the coulometers. This signal is applied to load control circuit 13 to disconnect load 16 from battery 14. Load control circuit 13 can be any conventional electromechanical or electronic switch that will respond to the signal from transistor 27.

In this respect all the elements illustrated by blocks in all the figures of the drawing are conventional elements available in the market.

While battery 14 was on load multiple rate charger 15 may have been supplying a trickle charge to the battery or no charge at all. If no trickle charge is provided, then the number of charge rates available, as will become apparent, is equal to the number of coulometers provided. If on the other hand a trickle charge is provided, then the number of charge rates available is one more than the number of coulometers provided.

Multiple rate charger 15 is controlled by charge rate control circuit 12 and operates Such that it always supplies the highest charge rate possible unless instructed otherwise by charge rate control circuit 12 and sensing circuit 11. Thus, when coulometers 20, 21 and 22 have reached one of their end points and load 16 is disconnected in response to a signal from transistor 27 as described above, multiple rate charger 15 supplies its highest rate of charge to battery 14. Due to networks 23, 24 and 25, a different amount of this charging current passes through each of the coulometers 20, 21 and 22. Therefore, coulometers 20, 21 and 22 will reach their other end points at different times. In FIG. 2, coulometer 20 will reach its other end point first, coulometer 21 will reach its other end point next, and then coulometer 22 will finally reach its other end point. When coulometer 20 reaches this end point, the resistors in networks 24 and 25 allow the voltage rise across coulometer 20 to be sensed by transistor 26 so long as the charge rate is high enough to maintain a voltage drop across these resistors that is equal to the voltage rise across coulometer 20. In response to this voltage rise, transistor 26 provides a signal to charge rate control circuit 12 which in turn sets multiple rate charger 25 at a lower charge rate. At this reduced charge rate, the voltage drop across the resistors in networks 24 and 25 is reduced to a point that the coulometers 21 and 22 short the sense signal from coulometer 20 so that transistor 26 no longer recognizes an end of charge signal across the coulometers. At a later time, coulometer 21 will exhibit its voltage rise and the charge rate will again be reduced in the same manner as described above with respect to coulometer 20. Finally, coulometer 22 will exhibit its voltage rise and multiple rate charger 15 will either be turned off or reduced to a trickle charge. Thus, using the three coulometers of FIG. 2, the circuit of FIG. 1 provides either three charge rates or four, if one is a trickle rate.

From the foregoing description it is obvious that the amount of current supplied to battery 14 by multiple rate charger 15 is equal to the amount of current supplied to load 16 by battery 14. This is assured by the action of coulometers 20, 21 and 22. Thus, at no time can battery 14 be overcharged. As soon as coulometer 22 reaches its end point, battery 14 is again placed on load 16, thus the battery is on load when the trickle charge rate is provided, if such a rate is provided.

FIG. 3 shows a second embodiment of the invention in which the coulometers are connected in series and a constant voltage charger is used. As shown in FIG. 3, the three serially connected coulometers 30, 31 and 32 are provided. The coulometers 30, 31 and 32 are of the same type as coulometers 20, 21 and 22 of FIG. 2. Therefore, these coulometers operate in the same manner as coulometers 20, 21 and 22; the detailed operation of which was described above with reference to FIGS. 4 and 5. In the circuit of FIG. 3 any number of coulometers governed by the number of charge rates desired can be provided. Coulometers 30, 31 and 32 are shunted by the diode-resistance networks 33, 34 and 35, respectively. A battery 36 is also connected in series with the coulometers. A constant voltage charger 38 and a load 37 are connected across the series combination of coulometers 30, 31 and 32 and battery 36.

With the diode-resistance networks 33, 34 and 35 being provided, coulometers designed to have the same current measuring capacity are used for coulometers 30, 31 and 32. However, these networks can be omitted if coulometers 30, 31 and 32 are replaced by coulometers designed to have different current measuring capacity. When battery 36 is first placed on load 37 and the remaining circuitry is initially connected as shown in FIG. 3, coulometers 30, 31 and 32 are at one of their end points. Battery 36 is now supplying current to load 37 and constant voltage charger 38 is also supplying a charging current to battery 36, since the charger is continuously operating. However, as will become apparent, battery 36 is only receiving a trickle charge because all three coulometers are at an end point. As battery 36 supplies current to load 37, coulometers 30, 31 and 32 move from their end points to an intermediate point. However, due to diode-resistance networks 33, 34 and 35, coulometers 30, 31 and 32 will be at different intermediate points at any given time; and will, therefore, return to their initial end points and exhibit their voltage rises at different times sequentially as constant voltage charger supplies charging current to battery 36. As each of the coulometers returns to its end point due to the charging current, the voltage rise across that coulometer is subtracted from the voltage output of charger 36, thus reducing the charging voltage applied to battery 36. More precisely, the operation of the current of FIG. 3 is as follows: When coulometers 30, 31 and 32 move from their end points to different intermediate points, a high charge rate is applied to battery 36 from constant voltage charger 38; as the coulometers 30, 31 and 32 sequentially return to their high voltage states (end points), the charge rate is sequentially reduced down to a trickle. Thus, a stepwise reduction in charging rate from an initial high rate to a trickle charge is obtained with the circuitry of FIG. 3.

While it is probably apparent, it is noted that unlike the circuit of FIG. 1, some trickle charge is always provided with the circuit of FIG. 3 since constant voltage charger 38 is always operating. Thus, in FIG. 3, the number of charge rates is one greater than the number of coulometers provided.

While the invention has been described with reference to particular embodiments, it will be apparent to those skilled in the art that various modifications and changes can be made to these embodiments without departing from the spirit and scope of the invention as set forth in the appended claims.

What is claimed is:

1. Apparatus for charging a battery comprising:
    a battery having first and second terminals;
    a load circuit having first and second terminals;
    a load control circuit for automatically uncoupling and coupling said battery from said load circuit, said load control circuit having first, second and third terminals;

a coulometer having first and second terminals;
means to couple said first terminal of said battery to said first terminal of said load circuit;
means to couple said second terminal of said load circuit to said first terminal of said load control circuit;
means to couple said second terminal of said battery to said second terminal of said coulometer;
means to couple said first terminal of said coulometer to said second terminal of said load control circuit;
a multiple rate charger having a first terminal coupled to said first terminal of said load circuit and said first terminal of said battery, a second terminal coupled to said first terminal of said coulometer and said second terminal of said load control circuit and a third terminal;
a charge rate control circuit having a first terminal coupled to said third terminal of said multiple rate charger and a second terminal; and
a sensing circuit including a first transistor having an emitter electrode coupled to second terminal of said coulometer and said second terminal of said battery, a base electrode coupled to said first terminal of said coulometer and said second terminal of said load control circuit and a collector electrode coupled to said second terminal of said charge rate control circuit, and a second transistor having an emitter electrode coupled to said base electrode of said first transistor, a base electrode coupled to said emitter electrode of said first transistor and a collector electrode coupled to said third terminal of said load control circuit.

2. The apparatus as defined in claim 1 wherein said coulometer comprises a plurality of individual coulometers connected in parallel.

3. The apparatus as defined in claim 2 wherein a separate parallel connected diode-resistance circuit is connected in series with each one of said plurality of coulometers except one, said one coulometer having a pair of oppositely poled parallel connected diodes connected in series therewith.

4. Apparatus for charging a battery comprising:
a load circuit;
a battery;
a plurality of series connected coulometers, each of said plurality of series connected coulometers having a different charge capacity;
means to couple said plurality of series connected coulometers in series with said battery;
means to connect said load circuit across said series combination of said plurality of coulometers and said battery;
a constant voltage charger; and
means to connect said constant voltage charger across said series combination of said plurality of coulometers and said battery.

5. Apparatus for charging a battery comprising:
a load circuit;
a battery;
a plurality of series connected coulometers all having the same charge capacity;
separate diode-resistance networks connected across each one of said plurality of series connected coulometers;
means to couple said plurality of series connected coulometers in series with said battery;
means to connect said load circuit across said series combination of said plurality of coulometers and said battery;
a constant voltage charger; and
means to connect said constant voltage charger across said series combination of said plurality of coulometers and said battery.

6. The apparatus as defined in claim 5 wherein each of said separate diode-resistance networks comprises a diode, a first resistor connected in series with said diode, and a second resistor connected in parallel with said series combination of said first resistor and said diode.

7. Apparatus for charging a battery comprising:
a battery;
a load circuit coupled to said battery;
a battery charger coupled to said battery;
means coupled to said battery for measuring the amount of current flow, said means for measuring the amount of current flow comprising a plurality of parallel connected coulometers;
means responsive to said plurality of coulometers for charging said battery at an initial high rate when said plurality of coulometers has measured a preset amount of current flow from said battery to said load; and
means responsive to each one of said plurality of coulometers for reducing said initial high rate of charge to said battery down to substantially a zero charge in steps equal in number to the number of said plurality of coulometers, each of said plurality of coulometers providing a signal at different times to effect said step-by-step reduction in the charge rate to said battery.

8. The apparatus as defined in claim 7 wherein a separate circuit network comprising a parallel connected diode and resistor is connected to each of said plurality of coulometers except one, said one coulometer having a circuit network comprising parallel oppositely poled diodes connected thereto.

9. The apparatus as defined in claim 8 wherein said load is uncoupled from said battery when said battery is being charged until said charge is reduced to said substantially zero charge at which time said load is recoupled to said battery.

10. The apparatus as defined in claim 2 wherein said charger is a constant voltage charger.

11. Apparatus for charging a battery comprising:
a battery;
a load circuit coupled to said battery;
a battery charger coupled to said battery;
means coupled to said battery for measuring the amount of current flow, said means for measuring the amount of current flow comprising a plurality of series connected coulometers;
means responsive to said plurality of series connected coulometers for charging said battery from said charger at an initial high charge rate when said plurality of series connected coulometers has measured a preset amount of current flow from said battery to said load; and
means responsive to each of said plurality of coulometers for reducing said initial high charge down to a trickle charge in steps equal in number to the number of said plurality of series connected coulometers in response to a voltage rise across each of said plurality of series connected coulometers, said coulometers each exhibiting said voltage rise at a different time to effect said step-by-step reduction of said charge rate.

12. The apparatus as defined in claim 11 wherein a separate circuit network comprising a first resistor connected in series with a diode and a second resistor connected in parallel with said series connected first resistor and diode is connected across each one of said plurality of coulometers.

* * * * *